United States Patent [19]

MacKarvich

[11] Patent Number: 5,316,329
[45] Date of Patent: May 31, 1994

[54] SLIDING BOAT TRAILER ROLLER MOUNT

[76] Inventor: Charles J. MacKarvich, 6220 SW. 126th St., Miami, Fla. 33156

[21] Appl. No.: 54,055

[22] Filed: Apr. 29, 1993

Related U.S. Application Data

[63] Continuation-in-part of Ser. No. 796,253, Nov. 22, 1991, abandoned.

[51] Int. Cl.$^5$ ............................................. B60P 3/10
[52] U.S. Cl. ............................... 280/414.1; 414/534; 193/35 SS
[58] Field of Search ............... 280/414.1, 414.3, 111; 414/529, 533, 534; 193/35 SS, 35 B; 198/826; 114/344

[56] References Cited

U.S. PATENT DOCUMENTS

| | | | |
|---|---|---|---|
| 4,464,092 | 8/1984 | Chambers et al. | 280/414.1 X |
| 4,717,165 | 1/1988 | Johnson | 280/414.1 |
| 4,997,332 | 3/1991 | Johnson | 280/414.1 X |
| 5,133,570 | 7/1992 | Godbersen | 280/414.1 |

OTHER PUBLICATIONS

Brochure of Marine Venture Enterprises, Inc., of Baltimore, Md., showing conventional boat trailers.
Brochure of Long Trailer Co., of Tarboro, N.C., showing conventional boat trailers.

Primary Examiner—Karin L. Tyson
Assistant Examiner—Victor E. Johnson
Attorney, Agent, or Firm—Foley & Lardner

[57] ABSTRACT

A sliding boat trailer roller mount is used when loading or unloading a boat from a boat trailer. The roller mount includes a mounting arm with an arch, a saddle with a curved groove in which the mounting arm rocks and slides, and a roller at each end of the mounting arm. A pair of saddles are attached to the ends of a pivot arm. A plurality of pairs of pivot arms are pivotally mounted on a boat trailer. The curvature of the mounting arm is such that it slides and pivots within the curved groove of the saddle, allowing the rollers to follow the compound curvature of a boat hull during loading or unloading.

17 Claims, 2 Drawing Sheets

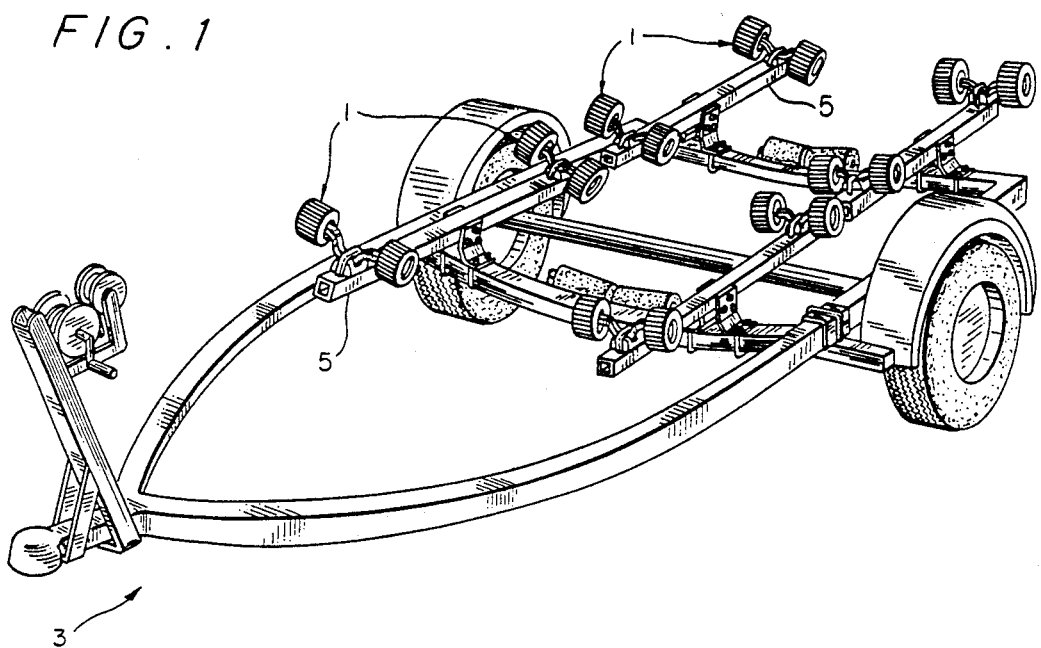
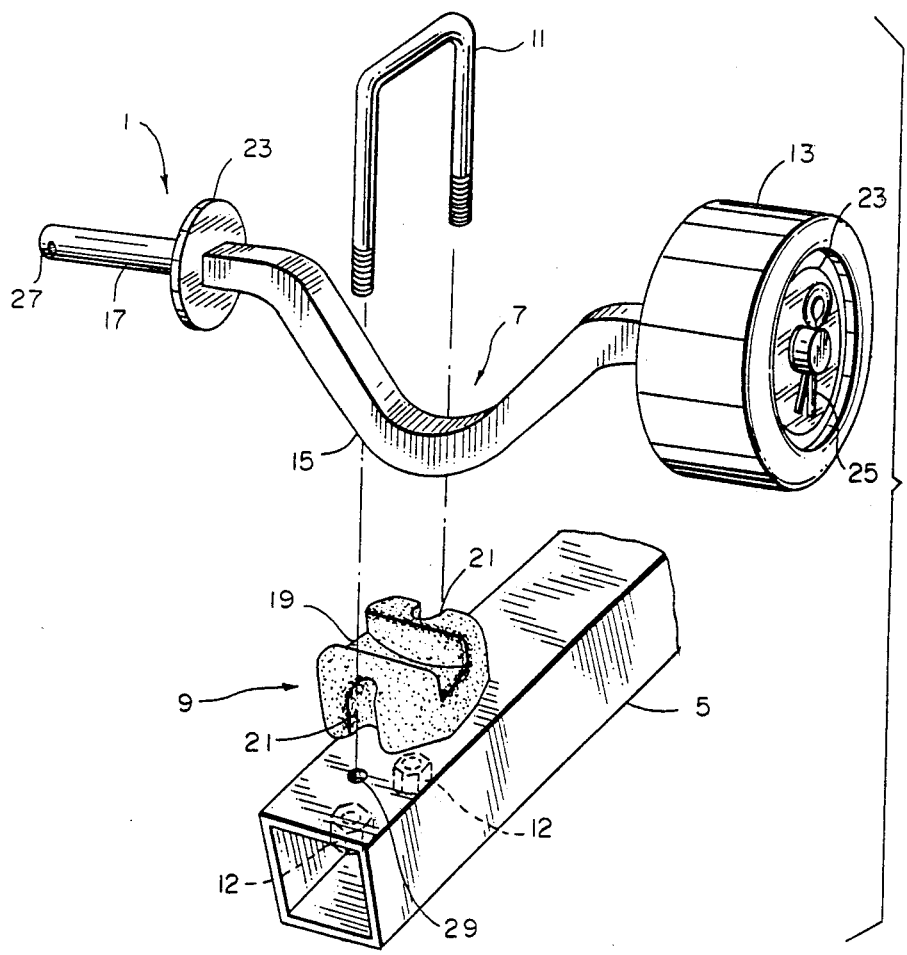

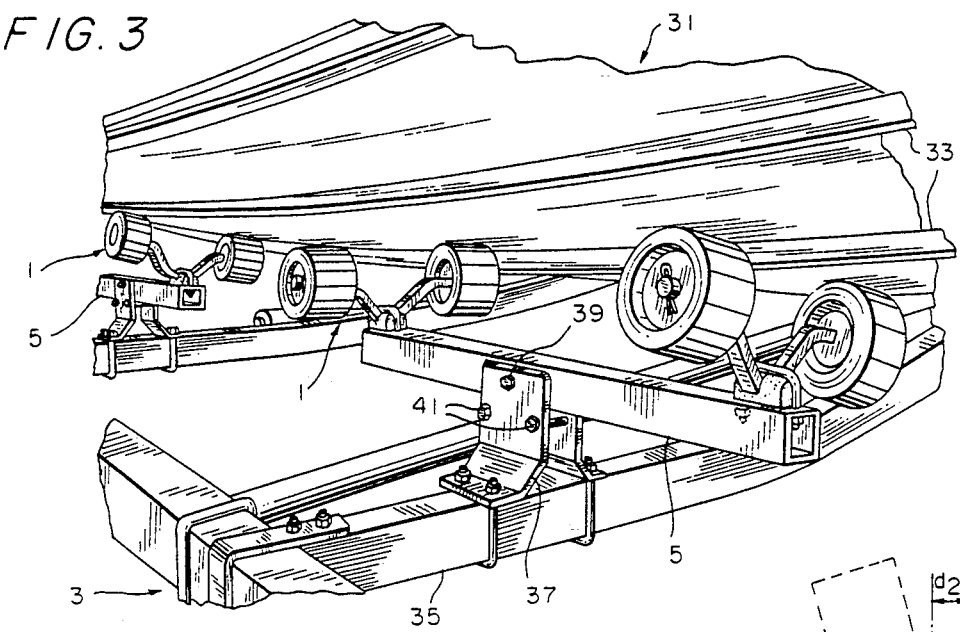
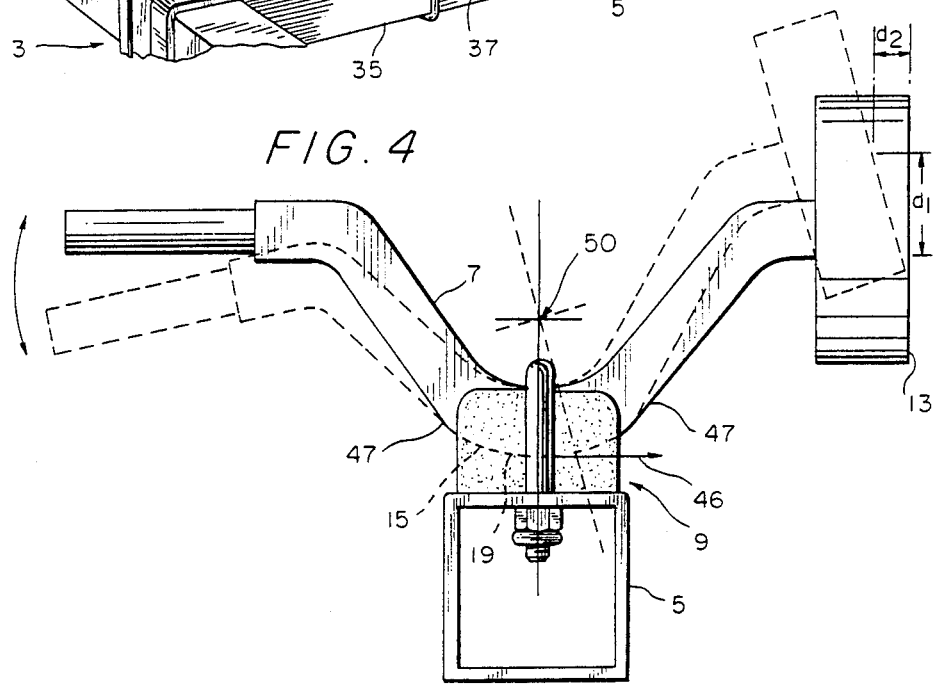
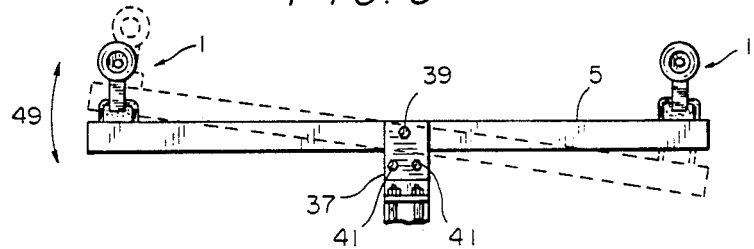

SLIDING BOAT TRAILER ROLLER MOUNT

CROSS-REFERENCE TO RELATED APPLICATION

This application is a continuation-in-part of my copending U.S. patent application Ser. No. 07/796,253, filed Nov. 22, 1991, now abandoned.

BACKGROUND OF THE INVENTION

The invention relates to a boat trailer roller mount, and, more particularly, to an adjustable roller mount for use on a boat trailer which adapts to the configuration of a boat being loaded onto or unloaded from a boat trailer.

A traditional boat trailer for transporting boats typically has roller assemblies on which the boat hull is rolled as it is loaded onto or unloaded from the boat trailer. Boat hulls have a triple compound curvature, so as a result, the roller assemblies must be adaptable to the changing curvature as the boat is moved along the roller assemblies.

Such roller mounts typically include multiple pairs of rollers on mounting arms which pivot about a centrally disposed axis. As the boat is loaded onto or unloaded from a trailer which uses conventional roller assemblies, the roller assemblies cross the strakes on the hull, and the compound curvature of the boat hull forces some of the rollers to pivot out of contact with the hull. As a result, all of the weight is applied to the remaining rollers, and the boat assumes a higher position on the trailer, becoming more unwieldy and less stable. A further problem caused by conventional roller mounts is that when the rollers cross the strakes on the boat hull, further instability and difficulty in loading or unloading the boat are created. One method of dealing with these problems is to supply the trailer with large numbers of rollers. Unfortunately, the cost and difficulty of assembly increases in relation to the number of rollers required.

Numerous complex pivot mechanisms have been tried to overcome these problems with a resulting increase in cost but with little success. There remains a need for a simple and inexpensive roller mount which can successfully adapt to the compound curvature of a boat hull.

SUMMARY OF THE INVENTION

An object of the invention is to provide a sliding boat trailer roller mount, in which the rollers maintain contact with the boat hull as the boat is moved forward or backward on the trailer.

Another object of the invention is to provide a boat trailer roller mount which requires fewer parts, and is therefore less expensive to manufacture and easier to assemble.

Another object of the invention is to provide a boat trailer roller mount in which the mounting arm slides and rocks to maintain contact with a boat hull having compound curvature, thus allowing greater stability during loading and unloading of the boat.

Another object of the invention is to provide a boat trailer roller mount, in which the lateral motion of the roller mount maintains the strake within the roller mount, so that the roller mount does not cross the strake.

A further object of the invention is to provide a boat trailer roller mount in which the boat maintains a lower loading and unloading profile.

The boat trailer roller mount of the invention includes a saddle with a groove having a concavely curved bottom and a roller assembly having a convexly curved support portion slidably received in the groove.

In accordance with a further preferred aspect of the invention, the boat trailer roller mount includes a saddle with a plurality of faces, with a groove having a concavely curved bottom in an upper face; a mounting arm with a curved support portion received in the groove, and a pair of horizontally elongated cylindrical ends; a fastener placed over the mounting arm for securing the saddle and mounting arm to a boat trailer; and rollers rotatably fixed on the ends of the mounting arm.

BRIEF DESCRIPTION OF THE DRAWINGS

An exemplary embodiment of the invention is illustrated in the drawings and described in detail below. In the drawings:

FIG. 1 is a perspective view of a boat trailer with a plurality of sliding boat trailer roller mounts.

FIG. 2 is an exploded view of the sliding boat trailer roller mount.

FIG. 3 is a close-up perspective view of the plurality of sliding boat trailer roller mounts in use with a boat.

FIG. 4 is an elevation of the mounting arm and the saddle showing the lateral and pivotal displacement.

FIG. 5 is a view of the pivot arm showing the pivoting action.

DETAILED DESCRIPTION OF THE PREFERRED EMBODIMENTS

FIG. 1 shows the general structure of a sliding boat trailer roller mount 1 in use with a boat trailer 3. The roller mounts are preferably mounted in pairs on the ends of pivot arms 5. The pivot arms may be beams which are preferably mounted in two opposing pairs in a direction parallel to the boat trailer's longitudinal axis.

FIG. 2 shows a sliding boat trailer roller mount 1 on an end of a pivot arm 5. A sliding boat trailer roller mount in accordance with the present invention comprises a mounting arm 7, a saddle 9, a fastener 11, and a pair of rollers 13 (only one of which is shown in this figure). The mounting arm 7 is preferably a bar with an arch 15 and with the ends 17 of the arch elongated horizontally. The bar for the mounting arm 7 preferably has a rectangular cross section to prevent it from pivoting about the transverse axis, however, other configurations are possible.

The saddle 9 shown in FIG. 2 is a block having a groove 19 with a curved bottom on an upper vertical face. The groove 19 should have a width slightly larger than the width of the mounting arm 7, such that the mounting arm 7 rests inside the groove 19, but the width is not so large that the mounting arm 7 is loose. The curvature of the groove 19 may advantageously be equal to or greater than the curvature at the bottom of the arch 15. If the curvature of the groove is greater than the curvature of the bottom of the arch, the mounting arm 7 may rock slightly when resting in the groove 19. The saddle 9 may also have a pair of channels 21 on opposing horizontal faces for receiving the fastener 11. In the illustrated embodiment the fastener 11 is shown as a U-bolt held by nuts 12, but it will be appreciated that other fastener arrangements could be used successfully. The saddle 9 is made out of a material which has sufficient structural integrity to withstand the applied forces and sufficient lubricity to allow the mounting arm 7 to slide. A preferred material for the saddle 9 is glass-reinforced thermoplastic acetal resin. A suitable material is commercially available from Dow Chemical Company of Midland, Mich. under the trade name "DELRIN".

As shown in FIG. 2, the ends 17 of the mounting arm 7 are cylindrical, whereas the arch 15 is rectangular in cross section. The pair of rollers 13 may be conventional 4-inch to 5-inch diameter rubber rollers with sleeve bearings. A roller is inserted onto the end 17 of the mounting arm 7. A pair of washers 23 inserted on the end 17 on both sides of the roller 13, and a pin 25 inserted through a hole 27 in the end 17 may be used to retain the roller 13, on the mounting arm 7. The difference between the cylindrical shape of the end 17 and the rectangular shape of the arch 15 prevents the inboard washer 23 from moving onto the arch 15.

As further shown in FIG. 2, the pivot arm 5 is a rectangular bar having two ends. Each end of the pivot arm 5 should have a pair of holes 29 corresponding to the channels 21 in the saddle 9. The fastener 11 may be a U-bolt with threaded ends. The saddle 9 is placed on the end of the pivot arm 5 between the pair of holes 29 and the arch 15 of the mounting arm 7 is placed in the groove 19. The fastener 11 is inserted through the channels 21 on the saddle 9 and through the holes 29 in the pivot arm, and then bolted on by nuts 12. Of course, it is possible to mount more than two adjustable roller assemblies on each pivot arm, if desired.

FIG. 3 shows a plurality of sliding boat trailer roller mounts 1 and pivot arms 5 in use with a boat 31 and a boat trailer 3 having lateral beams 35. The pivot arm 5 is pivotally mounted to the lateral beam of the boat trailer 35 by a pair of brackets 37 which are bolted to the lateral beam 35 of the trailer 3 underneath the center of the pivot arm. The pair of brackets 37 are connected to each other by two bolts 41. The pivot arm 5 preferably has a centrally located hole through which a bolt 39 may be inserted. Each bracket also preferably has a center hole through which the bolt 39 is inserted.

FIG. 4 illustrates the lateral and pivotal displacement which are made possible by this sliding boat trailer roller mount. The arch 15 of the mounting arm 7 is received in the groove 19 of the saddle 9, which is fastened to the pivot arm 5. The sliding motion 46 of the mounting arm 7 may be limited by indentations 47 in the arm 7 by positively engaging the edge of groove 19 of saddle 9, so that arm 7 is held against further movement even if the U-bolt fastener 11 is slightly loose.

As the boat (not shown) moves, the compound curvature of the hull raises or lowers the rollers on which it rests. With a conventional roller assembly having a fixed, centrally disposed pivot axis, for example when a roller is moved upward by 2 inches, the roller also experiences a lateral displacement of about 1½ inches or more. In distinct contrast with the sliding roller mount of the present invention, a 2 inch upward movement is effected with only about half the lateral displacement, i.e., with a lateral displacement of only about ¾ inch.

FIG. 4 illustrates the movement of the sliding roller mount of the invention between an initial position, shown in solid lines, and a displaced position, shown in broken lines. As can be seen from the figure, the center of the roller 13 undergoes a vertical displacement $d_1$, while at the same time experiencing a lateral displacement $d_2$. In a conventional roller mount which pivots about a fixed center, a vertical displacement of 2 inches is often accompanied by a lateral displacement of about 1½ inches or more. However, in the presently claimed invention the lateral sliding motion of the mounting arm 7 in the direction of arrow 46 partially offsets the lateral displacement of the roller 13 which otherwise would occur, so that the resulting net lateral displacement $d_2$ is considerably smaller than occurs in a conventional device. This offsetting compound motion of the roller mount of the invention occurs because the configuration of the curvatures of the curved central portion or arch 15 of the mounting arm 7 and the curved bottom of groove 19 inherently result in a center of rotation 50 which is offset to a position located intermediate the U-bolt 11 and the arch 15, on the one hand, and the axis of the cylindrical ends 17 of the mounting arm 7, on the other hand, as can be seen in FIG. 4. The resulting offsetting motion in turn enables the roller mount to better compensate for changes in the curvature of the boat hull, without raising up the boat as in the conventional roller mount, while enabling the boat to assume a lower position in which the boat is more stable and easier to handle. This also enables the roller mount of the present invention to maintain better contact with the hull of the boat. The sliding motion of the boat trailer roller mount thereby prevents the rollers from crossing the strakes by diminishing the lateral displacement $d_2$ of the roller.

FIG. 5 illustrates the vertical displacement which is made possible by the pivoting pivot arm 5. Bolt 39 allows the pivot arm 5 to pivot, while the bolts 41 limit the pivoting motion. This permits vertical motion 49 of the roller mounts 1 while the boat is loaded on or unloaded from the boat trailer.

Referring again to FIG. 3, a main advantage of the lateral motion of the sliding boat trailer mount is that this flexibility permits the mount 1 to not cross the strakes 33 on the boat hull 31 during loading or unloading. Further, an advantage created by the lateral, pivotal and vertical displacements is that the boat assumes a lower position in which the boat is more stable and easier to handle. Another advantage of the motion of the boat trailer roller mounts 1 is that this is more effective in maintaining contact between the rollers and the boat hull.

While specific embodiments of the invention have been described and illustrated, it will be clear that variations in the details of the embodiments specifically illustrated and described may be made without departing from the true spirit and scope of the invention as defined in the appended claims.

What is claimed is:

1. A sliding boat trailer roller mount comprising:
   (A) a saddle with a plurality of faces, having a horizontal groove with a concavely curved bottom formed in an upper face of the saddle;
   (B) a mounting arm with a curved support portion and a pair of substantially coaxially aligned horizontally elongated cylindrical ends, the support portion being received in the groove of the saddle and moveable therein to shift within the saddle;
   (C) a fastener which is placed over the curved support portion for securing said saddle and mounting arm to a trailer member; and
   (D) a pair of rollers rotatably fixed on the ends of said mounting arm; wherein said curved support portion of said mounting arm and said curved bottom of said groove have a mating curvature such that the mounting arm has a center of rotation which is offset to a position between said fastener and a line coaxial to said cylindrical ends of said mounting arm.

2. A sliding boat trailer roller mount according to claim 1, wherein the saddle has a pair of vertical channels formed on a pair of opposing side faces for receiving said fastener.

3. A sliding boat trailer roller mount according to claim 1, wherein said support portion of said mounting arm has a pair of indentations on an underside thereof, and edges of said groove of said saddle are received in said indentations to define limits of sliding movement for said mounting arm.

4. A sliding boat trailer roller mount according to claim 1, where the fastener is U-shaped.

5. A sliding boat trailer roller mount comprising an elongated pivot arm having a width and two ends; a bracket assembly comprising a pair of brackets spaced corresponding to the pivot arm width, for mounting on a boat trailer; the pivot arm being pivotally mounted between the pair of brackets; and a sliding boat trailer roller mount according to claim 1, attached by the fastener thereof to each end of the pivot arm so that the mounting arm of the roller mount is perpendicular to the pivot arm.

6. A sliding boat trailer roller mount according to claim 1, wherein the groove in the saddle has a curvature with a radius at least equal to the radius of the curved support portion.

7. A sliding boat trailer roller mount according to claim 5, wherein a plurality of pairs of pivot arms are mounted parallel to a longitudinal axis of a boat trailer.

8. A sliding boat trailer roller mount according to claim 1, wherein the mounting arm has a rectangular cross-section.

9. A sliding boat trailer roller mount comprising:
(A) a saddle having a groove with a concavely curved bottom; and
(B) a roller assembly comprising a mounting arm having an arched central portion with a rectangular cross section received in said groove of said saddle and moveable therein to shift within the saddle and a pair of substantially coaxially aligned elongated cylindrical ends, and a pair of roller rotatably fixed on the ends of the mounting arm;
(C) a fastener which is placed over the arched central portion for securing said saddle and mounting arm to a trailer member; and
wherein said arched central portion of said mounting arm and said curved bottom of said groove have a mating curvature such that said mounting arm has a center of rotation which is offset to a position between said fasteners and a line coaxial to said cylindrical ends of said mounting arm.

10. The sliding boat trailer roller mount of claim 9 in which the curved bottom of the groove of the saddle has a radius at least equal to a curvature of the support portion.

11. A sliding boat trailer roller mount according to claim 9, wherein said mounting arm consists of a single unitary member.

12. A sliding boat trailer roller mount according to claim 1, wherein said mounting arm consists of a single unitary member.

13. A sliding boat trailer roller mount according to claim 9, wherein said mounting arm has a pair of indentations which engage ends of said groove in said saddle to limit the sliding motion of the mounting arm.

14. A sliding boat trailer roller mount according to claim 9, further comprising a pivot arm for pivotally attaching to a boat trailer, to which a plurality of boat trailer roller mounts are attached.

15. A sliding boat trailer roller mount according to claim 14, in which a plurality of pairs of pivot arms with boat trailer roller mounts are attached to a boat trailer.

16. A method of providing a boat trailer roller mount, comprising:
(A) placing into a groove of a first saddle, a first mounting arm having a convexly curved central portion and substantially coaxially aligned cylindrical end portions which serve as shafts for rollers rotatably mounted thereon, the groove having a concavely curved bottom said first mounting arm being moveable to shift within said first saddle;
(B) placing into a groove having a concavely curved bottom formed in a second saddle, a second mounting arm having a convexly curved central portion and substantially coaxially aligned cylindrical end portions which serve as shafts for rollers rotatably mounted thereon said second mounting arm being moveable to shift within said second saddle;
(C) attaching said first and second saddles with said first and second mounting arms by means of fasteners to an elongated pivot arm; and
(D) pivotally mounting the pivot arm to a boat trailer; wherein said curved central portions of said mounting arms and said curved bottoms of said grooves have a mating curvature such that each said mounting arm has a center of rotation which is offset to a position between said fasteners and a line coaxial to said cylindrical ends of a respective one of said mounting arms.

17. A method according to claim 16, wherein said first mounting arm consists of a unitary member.

* * * * *